United States Patent Office 3,808,176
Patented Apr. 30, 1974

3,808,176
CURING OF ELASTOMERS WITH HALOSULFONAMIDES
Stephen E. Cantor, Cheshire, Conn., assignor to Uniroyal, Inc., New York, N.Y.
No Drawing. Filed Dec. 13, 1971, Ser. No. 207,647
Int. Cl. C08d 5/04; C08f 27/06
U.S. Cl. 260—79.3 R    21 Claims

ABSTRACT OF THE DISCLOSURE

Chemical compounds having the general formula $$Y[SO_2NX_2]_n$$

where X is chlorine, bromine or iodine, Y is phenyl, naphthyl, biphenyl or

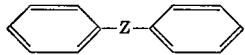

where Z is oxygen, sulfur, or alkylene or alkylidene having from 1 to 3 carbon atoms, and $n$ has a value of 2 or 3, are used as curing agents for elastomers such as conjugated diene polymer rubbers, e.g. nitrile rubber (NBR), butadiene-styrene rubbery copolymers (SBR), butyl rubber, as well as the EPDM rubbers which are terpolymers of ethylene, propylene and a non-conjugated diene third monomer.

The foregoing chemical compounds are advantageously used in conjunction with quinone-oximino compounds, such as p-quinone dioxime, or metal salts, ethers or esters thereof, in rubber cements generally and also in curing EPDM rubbers in any form, but especially in cement form, at ambient temperature.

BACKGROUND OF THE INVENTION (1) Field of the invention

The field of the invention is the use of certain halosulfonamides for curing elastomers.

(2) Description of the prior art

U.S. Pat. 2,442,083 shows self-curing butyl rubber cements containing a quinone-oximino compound and an N-chloro amide such as N-chlorobenzamide or 1,3-dichloro-5,5-dimethyl hydantoin. U.S. Pat. 2,548,505 shows the use of certain chlorosulfonamides as activators for the quinone dioxime cure of butyl rubber cements. The mechanism of quinone dioxime cure of butyl rubber has been elucidated by Flory and Rehner, Ind. Eng. Chem., vol. 38, pages 500 et seq. (1964) and in the books, "Construction Sealants and Adhesives" by Cook, published 1971 by John Wiley & Sons, New York and "Vulcanization of Elastomers," edited by Alliger and Sjothern, published 1964 by Reinhold, New York.

SUMMARY OF THE INVENTION

The invention resides in using chemical compounds having the general formula $$Y[SO_2NX_2]_n$$

where X is chlorine, bromine or iodine, Y is phenyl, naphthyl, biphenyl or

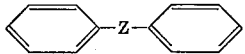

where Z is oxygen, sulfur, or alkylene or alkylidene having from 1 to 3 carbon atoms such as methylene, ethylene, propylene, isopropylene, ethylidene, propylidene and isopropylidene, and $n$ has a value of 2 or 3, for curing elastomers. In the foregoing formula the Y group

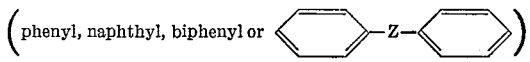

can be unsubstituted or can be substituted with alkyl (especially lower, i.e. $C_1$ to $C_8$, alkyl) or aryl (especially phenyl) moieties.

The foregoing compounds can be used as the sole vulcanization agent in curing highly unsaturated elastomers (by which is meant rubbery polymers of aliphatic conjugated diolefins and copolymers of such diolefins and one or more other unsaturated monomers, which copolymers contain copolymerized therein at least 25% by weight of aliphatic conjugated diolefin) typified by natural rubber (NR), butadiene-styrene rubbery copolymers (SBR), butadiene-acrylonitrile rubbery copolymers (NBR), so-called synthetic natural rubber, i.e. synthetic polyisoprene high in cis-1,4 configuration (IR), rubbery polybutadienes (BR), etc.

The forgeoing chemical compounds can also be used in conjunction with a quinone-oximino compound, especially a quinone dioxime such as p-quinone dioxime or dibenzoyl-p-quinone dioxime, to effect vulcanization of elastomers, such as the highly unsaturated elastomers mentioned above or other less unsaturated elastomers such as EPDM rubber (for definition see page 678 of Part 28 of "1966 Book of ASTM Standards") or butyl rubber. These elastomers may be in solid form or may be dissolved in any suitable volatile organic solvent to give a composition initially having a fluid consistency such as a so-called "cement," that is, a solution of the elastomer in a volatile organic solvent having relatively low viscosity and prepared by techniques which are conventional in the rubber art. The chemical compounds, when used in the combination with a quinone-oximino compound, are particularly effective in curing EPDM elastomers to tough vulcanizates in a short time at ambient temperatures. Thus, with EPDM rubber, excellent self-curing adhesives and other compositions can be produced which are able to bond seams, or repair tears, of cured EPDM sheets; likewise, caulks and sealants prepared from EPDM rubbers compounded with the aforementioned chemical compounds in conjunction with quinone-oximino compounds and in highly filled, putty-like form exhibit the valuable property of curing readily at ambient temperatures.

The halosulfonamides used in accordance with the present invention are far more effective when applied in elastomers curing systems of the type referred to above than such prior art chemical compounds as the N-chloroamides used in U.S. Pat. 2,442,083 and the chlorosulfonamides disclosed in U.S. Pat. 2,548,505.

Representative chemical compounds used in the practice of this invention are those having the following structural formulae:

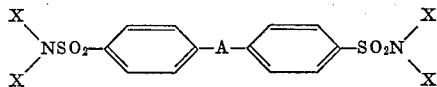

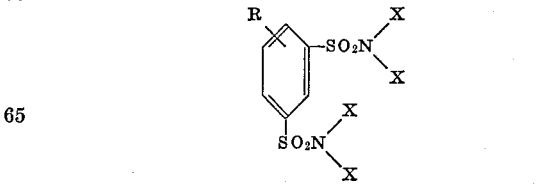

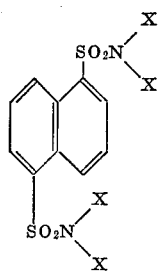

and

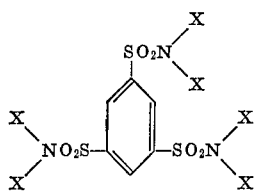

where X is either chlorine, bromine or iodine, A may be zero (i.e. the biaryl group is biphenyl), oxygen (oxy-), sulfur (thio-) or methylene, and R represents hydrogen, alkyl (especially $C_1$ to $C_8$ lower alkyl) or aryl (especially phenyl) moieties.

The amount of the halosulfonamide used in practicing the invention can range from 0.1 to 20 parts by weight per 100 parts of dry rubber. A preferred range is from 1 to 10 parts of halosulfonamide per 100 parts of dry rubber and the most highly preferred range is from 2 to 8 parts of the halosulfonamide.

When the halosulfonamides are used in conjunction with a quinone-oximino compound the weight ratio of halosulfonamide to quinone-oximino compound typically ranges from 1:1 to 10:1.

DESCRIPTION OF THE SPECIFIC EMBODIMENTS (1) Preparation of the chemicals

The halosulfonamides used in the present invention can be prepared readily by reacting the corresponding unhalogenated aryl sulfonamides with an alkali metal hypohalite. Examples A through D below give details of the preparation of four such compounds.

CAUTION

While the halosulfonamide compounds themselves appear to be stable against detonation or explosion, it is important that suitable precautions obvious to skilled organic chemists be taken in their preparation to prevent the development of explosive conditions during the reaction. The only instance of an explosion occurring which has been observed was the second preparation referred to in Example C below, wherein N,N,N',N' - tetrachloro-1,3-benzenedisulfonamide (TCBDS) was synthesized.

EXAMPLE A

Preparation of N,N,N',N'-tetrachloro-oxy-bis(benzenesulfonamide) (TCOBS)

In a 5 liter, three-necked flask fitted with a dropping funnel, thermometer and stirrer paddle are placed 135 gms. of 4,4'-oxy-bis(benzenesulfonamide) and 1500 ml. of cold water. To this slurry is added rapidly 1650 gms. of a 13% solution of sodium hypochlorite. The sulfonamide dissolves and no evolution of heat is observed. Finally the reaction mixture is treated with concentrated hydrochloric acid to precipitate the solid, white crystalline product in a 100% yield. The melting point is 129–132° C. and the melted material evolves chlorine gas at 160–180° C. The compound is soluble in a wide variety of organic solvents.

EXAMPLE B

Preparation of N,N,N',N'-tetrabromooxy-bis-(benzenesulfonamide) (TBOBS)

In a 5 liter, three-necked flask fitted with a dropping funnel, thermometer and stirrer paddle are placed 75 gms. of sodium hydroxide (1.87 mole) and 800 ml. of cold water. Slowly, while cooling with solid carbon dioxide and isopropanol, 30.7 ml. of bromine is added. After the formation of the sodium hypobromite, 23 gms. (.07 mole) of 4,4'-oxy-bis-(benzenesulfonamide) is added. A mild exothermic reaction takes place. After the reaction mixture has been stirred for 1.5 hours at ambient temperature, 100 ml. of glacial acetic acid is added to precipitate the product. The orange-yellow crystals are collected and washed several times with cold water to yield 39 gms. (89% yield) of product having a melting point of 97–100° C. The compound is insoluble in benzene, toluene, chloroform and carbon tetrachloride but soluble in acetone and methyl ethyl ketone.

EXAMPLE C

Preparation of N,N,N',N'-tetrachloro-1,3-benzenedisulfonamide (TCBDS)

A procedure similar to that described in Example A above is employed. A quantitative yield of the product is realized. The material is a white solid with a melting point of 119–123° C. This is an old chemical, having been described by Chattaway in J. Chem. Soc. 1905, page 155; Chattaway reported it to have a melting point of 128° C.

During a second preparation of this compound in a similar way *a violent explosion occurred*.

EXAMPLE D

Preparation of N,N,N',N'-tetrachloro-4,4'-biphenyl disulfonamide (TCBS)

Employing a technique similar to that described in Example A above, 33 gms. of 4,4'-biphenyl disulfonamide is converted to the product in a 96% yield. The white crystalline material, having a melting point of 218–219° C. is insoluble in benzene and hexane.

(2) Vulcanization of elastomers

Examples 1 through 7 below illustrates the practice of this invention using halosulfonamides made as just described. As is illustrated by Example 1, these halosulfonamides are able to crosslink and vulcanize highly unsaturated conjugated diolefin elastomers such as those mentioned above without the aid of other curatives or accelerators.

When these halosulfonamides are used in conjunction with quinone-oximino compounds, for example the quinone-oximino compounds shown in U.S. Pats. 2,170,191; 2,393,321; 2,442,083; and 2,548,505 in either the para or meta form or in the form of metal salts, ethers or esters (such as p-quinone dioxime or dibenzoyl-p-quinone dioxime) they develop rapid cures of highly unsaturated aliphatic conjugated diolefin elastomers or less unsaturated elastomers such as EPDM, at ambient temperatures.

Example 2 gives a comparison of the rate of cure in a 5% SBR cement, of a tetrahalosulfonamide (TCOBS) of the type used in the present invention and the dihalosulfonamides of U.S. Pat. 2,548,505. It is evident from Table II of that example that a dramatic increase in the rate of gel formation, as determined by viscosity measurement with a Brookfield viscometer, is obtained by employing one-third the molar amounts of the TCOBS.

Example 3 shows that treatment of a 5% EPDM cement with the same combination of quinone dioxime and activator as that used in run 3 of Table II requires 35 hours to produce gel at room temperature; this is related to the fact that EPDM rubbers contain many fewer sites for vulcanization than highly unsaturated diene rubbers such as SBR. However, N,N,N',N'-tetrachloro-1,3-benzenesulfonamide (TCBDS) is capable of gelling such EPDM cements in less than 10 seconds. Examination of Table III emphasizes this unusual result.

Conversion of EPDM black- or silica-filled masterbatches to cements of 5–40%, preferably 10–30% (by weight) solids content is readily accomplished. Treatment of such cements (containing p-quinone dioxime) with from 2 to 8 parts by weight/100 of rubber of the halosulfonamides used in the present invention produces cured vulcanizates in from 1 to 6 hours. The physical properties of the films so produced are shown in Table IV (Example 5) below in which comparisons of lead peroxide (a well-known prior art activator for vulcanization with quinone dioximes) and N,N-dichloro-p-toluene sulfonamide ("Dichloramine T") are also shown. The vulcanizate properties from the N,N,N',N'-tetrahalosulfonamide runs are markedly superior to both the lead peroxide and the "Dichloramine T" runs.

EPDM cements exemplified by runs 1 and 2 of Table IV, when painted or spread onto cured sheets of EPDM rubbers, are able to lap together such sheets in such a wa that excellent permanent seams are produced. The adhesive cements of the invention in which the tetrahalosulfonamides are employed are far superior to those containing lead peroxide or "Dichloramine T". These results are borne out by the adhesion data in Table IV.

EXAMPLE 1

Demonstrates ability of the chemicals used in the invention to act as sole vulcanization agents A sample of nitrile rubber (copolymer of butadiene and acrylonitrile) was compounded in the conventional manner with the ingredients set forth in Table I to obtain a masterbatch as shown. The N,N,N',N'-tetrachloro-oxybis(benzenesulfonamide) (TCOBS) was incorporated with the masterbatch on a cool two-roll rubber mill. The compounded stock was cured for thirty minutes at two different temperatures. A strong vulcanizate was produced at approximately 8 parts of TCOBS per 100 parts of rubber. See Table I. Treatment of the same masterbatch with "Dichloramine T" produced a gelled, short elongation vulcanizate.

TABLE I.—NITRILE RUBBER VULCANIZATION
[All parts are by weight]

| | Parts |
|---|---|
| Nitrile rubber (NBR) | 100.0 |
| HAF black | 50.0 |
| Antioxidant | 0.5 |
| Zinc oxide | 5.0 |
| Masterbatch (MB) | 155.5 |

| | Run A | | Run B | |
|---|---|---|---|---|
| MB | 155.5 | | 155.5 | |
| TCOBS | 3.5 | | 7.7 | |
| Cured 30' | 300° F. | 340° F. | 300° F. | 340° F. |
| S-100, p.s.i | 460 | 420 | 650 | 660 |
| S-200, p.s.i | 930 | 1,030 | 1,640 | 1,650 |
| S-300, p.s.i | 1,360 | 1,740 | | 2,930 |
| Ultimate tensile, p.s.i | 1,400 | 1,800 | 2,400 | 3,480 |
| Elongation at break, percent | 310 | 310 | 260 | 350 |
| Hardness, Shore A | 74 | 73 | 77 | 75 |

EXAMPLE 2

Demonstrates the marked effect of TCOBS vs. "Dichloramine T" in highly unsaturated rubber cements A cement was prepared by dissolving 50 gms. of SBR rubber (copolymer of butadiene and styrene) in 1000 gms. of benzene. The cement was treated with 0.2 gm. of p-quinone dioxime in a blender. Aliquots of this cement were treated with 10% solutions of N,N,N',N'-tetrachloro-oxy-bis(benzenesulfonamide) (TCOBS) and N,N-dichloro-p-toluene sulfonamide ("Dichloramine T") as shown in Table II. The development of viscosity (a measure of the crosslinking) was followed by the use of a Brookfield viscometer. See Table II for the results.

TABLE II
[Comparison of TCOBS and "Dichloramine T" in SBR cements]

| | Run 1 | Run 2 | Run 3 |
|---|---|---|---|
| 5.0% SBR cement, gm | 160 | 160 | 160 |
| p-Quinone dioxime, gm | 0.4 | 0.4 | 0.4 |
| "Dichloramine T," gm | 0.5 | 1.0 | |
| TCOBS, gm | | | 0.5 |

| | Viscosity (cps.) | | |
|---|---|---|---|
| Time (hrs.): | | | |
| 0 | 44 | 44 | (1) |
| 0.5 | 50 | 48 | |
| 1.0 | 60 | 65 | |
| 2.5 | 75 | 6,000 | |
| 3.0 | 96 | Gelled | |

[1] Gelled in the blender.

EXAMPLE 3

Demonstrates the marked effect of TCOBS and TCBDS vs. "Dichloramine T" in EPDM cements A 5% cement is prepared by dissolving 50 gms. of an EPDM elastomer having 55.2% ethylene, 40% propylene and 4.8% (all by weight) 5-ethylidene-2-norbornene and a Mooney viscosity (ML–4) at 212° F. of 55 in 1000 gms. of benzene. The cement is treated in a homeblender for 1 minute with p-quinone dioxime and either "Dichloramine T" or TCOBS or TCBDS in the amounts given in Table III. The rate of cure (gel formation) is followed by means of the Brookfield viscometer. The formulations and results are given in Table III.

TABLE III
[Comparison of TCOBS, TCBDS and "Dichloramine T" in EPDM cements (all parts are by weight)]

| | Run 1 | Run 2 | Run 3 | Run 4 |
|---|---|---|---|---|
| 5.0% EPDM cement | 120 | 120 | 120 | 120 |
| p-Quinone dioxime | 0.4 | 0.4 | 0.4 | 0.4 |
| "Dichloramine T" | 1.0 | | | |
| TCOBS | | 0.5 | | |
| TCBDS | | | | 0.6 |

| | Viscosity (cps.) | | | |
|---|---|---|---|---|
| Time (hrs.): | | | | |
| 1.0 | 20 | 20 | 20 | (1) |
| 17 | 25 | 2,400 | 20 | |
| 35 | 20 | Gelled | 20 | |

[1] Gelled in 10 seconds.

The rate of cure of the chlorosulfonamide/p-quinone dioxime systems of the present invention is much greater than that of the dichloro sulfonamide/p-quinone dioxime systems taugh by U.S. Pat. 2,548,505 for use with butyl rubber, with the quantities employed adjusted to represent equal molar amounts of the various compounds. In fact, one-half to one-third molar quantities of TCOBS and TCBDS are much more effective than molar amounts of "Dichloramine T." Actually, the N,N,N',N'-tetrachloro-1,3-benzenedisulfonamide (TCBDS) used in the practice of the present invention is so fast that the gel is produced in less than 10 seconds.

EXAMPLE 4

Depicts the correct level of TCOBS vs. "Dichloramine T"

The EPDM of Example 3 was compounded in accordance with the following recipe:

| | Parts by weight |
|---|---|
| EPDM elastomer | 100 |
| HAF black | 50 |
| Zinc oxide | 5 |
| Antioxidant | 0.5 |

The black masterbatch made as just described was converted to a 5% cement in benzene. Aliquots of this cement were treated with dilute solutions of TCOBS and "Dichloramine T" and their respective rates of gel formation were measured by the Brookfield viscometer.

It was found that as the amount of TCOBS is increased the rate of gel formation also increased. The pot life of a cement containing 10 parts of TCOBS per 100 parts of rubber was found to be less than 30 minutes at room temperature.

EXAMPLE 5

Adhesive compositions

The following is an illustrative example of the preparation of an adhesive composition according to the present invention:

A masterbatch having the following formulation is first prepared, using the EPDM elastomer of Example 3.

| | Parts by weight |
|---|---|
| EPDM rubber | 100 |
| HAF black | 50 |
| SRF black | 90 |
| Extender oil | 80 |
| Zinc oxide | 5 |
| p-Quinone dioxime | 4.5 |
| | 329.5 |

This masterbatch is dissolved in xylene to 30% (by weight) solids. The resulting cement is quite stable for long periods of time at room temperature. However, after TCOBS is incorporated therewith in accordance with the present invention the cement will begin to gel. The pot life of the mixture is sufficiently long to allow one to paint the black cement on the surface of materials to be bonded and then to join them together. In a typical case, cured sheets of EPDM rubber were adhered with this cement along a 1″ overlap. The remaining cements were poured into molds and cured at room temperature for 4 days to produce tough vulcanizates. The formulations used, the properties of the vulcanizates, and the results of adhesion pull tests are given in Table IV.

TABLE IV

| | Run 1 | Run 2 | Run 3 | Run 4 | Run 5 |
|---|---|---|---|---|---|
| MB (Masterbatch) | 329.5 | 329.5 | 329.5 | 329.5 | 329.5 |
| Lead peroxide | | | | | [1] 12 |
| "Dichloramine T" | | | 3.0 | 6.0 | |
| TCOBS | 3.0 | 6.0 | | | |
| Xylene | 1,115 | 1,115 | 1,115 | 1,115 | 1,115 |
| Cured 4 days at R.T.: | | | | | |
| S-100, p.s.i | 320 | 510 | 250 | 480 | [2] |
| S-200, p.s.i | 720 | 1,200 | 840 | 1,250 | |
| S-300, p.s.i | 1,260 | 1,820 | | | |
| Ultimate tensile, p.s.i | 1,640 | 2,040 | 1,260 | 1,650 | |
| Elongation at break, percent | 400 | 350 | 290 | 260 | |
| Elongation set at break, percent | 20 | 15 | 10 | 10 | |
| Adhesion pads 1 sq. inch overlap: "Instron" (trademark) pull at 12″/min. (R.T.), lbs | 24 / 23 | 25 / 27 | 14 / 15 | 16 / 16 | 12 / 12 |

[1] 75% pure lead peroxide.
[2] Too soft to pull.

The much higher adhesion values for runs 1 and 2 which were in accordance with the present invention are to be noted.

EXAMPLE 6

Caulks & sealants

Caulks (solids of 85–95%) and sealants (solids of 50–65%) are prepared by kneading together EPDM elastomers, with fillers, oils and solvents such that a knife-spreadable gum is produced. The following formulation is representative using the EPDM of Example 3:

| | Parts by weight |
|---|---|
| EPDM rubber | 100 |
| HAF black | 50 |
| SRF black | 90 |
| Extender oil | 80 |
| Zinc oxide | 5 |
| TCOBS | 6 |
| p-Quinone dioxime | 4.5 |
| Xylene | 15 |
| | 350.5 |

The thick paste was spread out and allowed to stand at room temperature for 3 days during which time it cured to a tough vulcanizate.

EXAMPLE 7

Demonstrates hot rapid cures of solid EPDM stock with combination of the new chemicals used in accordance with the invention and p-quinone dioxime The masterbatch shown in Table V below was prepared in the usual way. Two portions of this masterbatch were compounded with the indicated amounts of TCOBS and TCBDS. The cured vulcanizates had the properties shown in the table. The EPDM elastomer employed had a Mooney viscosity (ML–4) of 82 at 212° F., and a content of 51% ethylene, 40% propylene and 9% 5-ethylidene-2-norbornene, all by weight.

TABLE V
[All parts are by weight]

| | | |
|---|---|---|
| EPDM rubber | 100.00 | |
| SRF black | 50.00 | |
| Zinc oxide | 5.00 | |
| Stearic acid | 0.75 | |
| p-Quinone dioxime | 5.00 | |
| Masterbatch | 160.75 | |
| MB | 160.75 | 160.75 |
| TCOBS | 7.5 | |
| TCBDS | | 6.0 |
| Cured 3 min. at 188° F.: | | |
| S-100, p.s.i | 430 | 520 |
| S-200, p.s.i | 930 | 1,080 |
| S-300, p.s.i | 1,290 | 1,560 |
| Ultimate tensile, p.s.i | 1,840 | 1,870 |
| Elongation at break, percent | 430 | 360 |
| Hardness, Shore A | 71 | 71 |

GENERAL

Elastomeric compositions made in accordance with the teachings of the present invention can be used in many diverse applications. Thus, solid stocks embodying the invention (as distinguished from cements, caulks and sealants) can be used for the production of virtually any kind of vulcanized rubber products, such as, but not limited to, tires, conveyor belts, power transmission belts, pressure hose, containers made from rubberized fabrics, mechanical rubber goods, molded rubber products, air bags used in automotive restraint systems, footwear, etc. The EPDM compositions made in accordance with the invention which exhibit the ability to cure at ambient temperatures, especially those compositions which contain a volatile organic solvent for the EPDM in amount sufficient to impart a flowable consistency, open up many new applications not heretofore possible with EPDM elastomers; following are some of those applications;

(1) Pit liner adhesives and sealants. Typically these are used at about 30% solids. They are relatively easy to apply and they possess sufficient shelf life. Versions having higher solids levels can be used as sealants to fill in gaps or wrinkles in pit liner seams.

(2) EPDM coating compositions. Because of their outstanding adhesion to cured EPDM, these coating compositions can be used in a wide variety of applications, for example to paint shingle designs, etc., on EPDM sheet roofing to thereby enhance consumer acceptance.

(3) Liquid applied waterproofing and roofing compositions. These compositions make possible poured or sprayed roofing systems having excellent resistance to outdoor aging.

(4) High solids content (about 95%) caulking materials otherwise similar in composition to the poured or sprayed roofing materials mentioned above.

These are only a few of the innumerable practical applications to which compositions of the present invention can be put.

Having thus described my invention, what I claim and desire to protect by Letters Patent is:

1. The method of curing a highly unsaturated diene polymer elastomer, said elastomer being a polymer of (a) a conjugated aliphatic diolefin, or (b) a conjugated aliphatic diolefin and one or more other unsaturated monomers containing copolymerized therein at least 25% by weight of said aliphatic conjugated diolefin, which comprises incorporating with said elastomer a chemical compound having the general formula

Y[SO₂NX₂]ₙ where X is chlorine, bromine or iodine, Y is unsubstituted, alkyl-substituted or aryl-substituted phenyl, naphthyl, biphenyl or

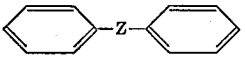

where Z is oxygen, sulfur, or alkylene or alkylidene having from 1 to 3 carbon atoms, and n has a value of 2 or 3, and subjecting the resulting mixture to curing conditions.

2. The method of claim 1 wherein said compound is N,N,N',N'-tetrachloro-oxy-bis(benzenesulfonamide).

3. The method of claim 1 wherein said compound is N,N,N',N'-tetrachloro-1,3-benzenedisulfonamide.

4. The method of curing a rubbery terpolymer of ethylene, propylene and a non-conjugated diene monomer which comprises admixing said terpolymer with a compound having the general formula

Y[SO₂NX₂]ₙ where X is chlorine, bromine or iodine, Y is unsubstituted, alkyl-substituted or aryl-substituted phenyl, naphthyl, biphenyl or

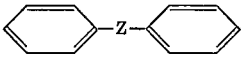

where Z is oxygen, sulfur, or alkylene or alkylidene having from 1 to 3 carbon atoms, and n has a value of 2 or 3, and with a quinone-oximino compound, and subjecting the resulting mixture to ambient temperature for a period of time sufficient to bring about cure of said terpolymer.

5. The method of claim 4 wherein said compound is N,N,N',N'-tetrachloro-oxy-bis(benzenesulfonamide).

6. The method of claim 4 wherein said compound is N,N,N',N'-tetrachloro-1,3-benzenedisulfonamide.

7. The method of claim 1 which comprises forming a solid mixture comprising said elastomer and a compound having the general formula

Y[SO₂NX₂]ₙ where X is chlorine, bromine or iodine, Y is unsubstituted, alkyl-substituted or aryl-substituted phenyl, naphthyl, biphenyl or

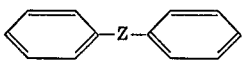

where Z is oxygen, sulfur, or alkylene or alkylidene having 1 to 3 carbon atoms, and n has a value of 2 or 3, and heating said solid mixture to a temperature of at least 300° F. to effect curing of said elastomer.

8. The method of claim 7 wherein said compound is N,N,N',N'-tetrachloro-oxy-bis(benzenesulfonamide).

9. The method of claim 8 wherein said elastomer is a butadiene-acrylonitrile copolymer.

10. A composition of matter comprising a highly unsaturated elastomer diene polymer, said elastomer being a polymer of (a) a conjugated aliphatic diolefin, or (b) a conjugated aliphatic diolefin and one or more other unsaturated monomers containing copolymerized therein at least 25% by weight of said aliphatic conjugated diolefin, and a compound having the general formula

Y[SO₂NX₂]ₙ where X is chlorine, bromine, or iodine, Y is unsubstituted, alkyl-substituted or aryl-substituted phenyl, naphthyl, biphenyl or

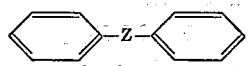

where Z is oxygen, sulfur, or alkylene or alkylidene having from 1 to 3 carbon atoms, and n has a value of 2 or 3.

11. A curable composition of matter comprising a sulfur-vulcanizable elastomer selected from the group consisting of high unsaturated diene polymer rubbers and rubbery terpolymers of ethylene, propylene and a non-conjugated diene monomer, said diene polymer rubbers being polymers of (a) a conjugated aliphatic diolefin, or (b) a conjugated aliphatic diolefin and one or more other unsaturated monomers containing copolymerized therein at least 25% by weight of said aliphatic conjugated diolefin, a compound having the general formula

Y[SO₂NX₂]ₙ where X is chlorine, bromine or iodine, Y is unsubstituted, alkyl-substituted or aryl-substituted phenyl, naphthyl, biphenyl or

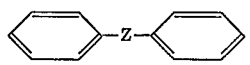

where Z is oxygen, sulfur, or alkylene or alkylidene having from 1 to 3 carbon atoms, and n has a value of 2 or 3, and a volatile inert organic solvent in which said elastomer is dissolved, said solvent being present in an amount sufficient to impart a fluid consistency to the composition.

12. A curable composition of matter comprising a rubbery terpolymer of ethylene, propylene and a non-conjugated diene monomer, a compound having the general formula

Y[SO₂NX₂]ₙ where X is chlorine, bromine or iodine, Y is unsubstituted, alkyl-substituted or aryl-substituted phenyl, naphthyl, biphenyl or

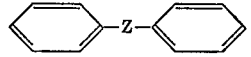

where Z is oxygen, sulfur, or alkylene or alkylidene having from 1 to 3 carbon atoms, and n has a value of 2 or 3, and a quinone-oximino compound.

13. The composition of matter of claim 12 wherein said quinone-oximino compound is p-quinone dioxime.

14. The composition of matter of claim 13 wherein said first-named compound is N,N,N',N'-tetrachloro-oxy-bis(benzenesulfonamide).

15. The composition of matter of claim 13 wherein said first-named compound is N,N,N',N'-tetrachloro-1,3-benzenedisulfonamide.

16. A highly unsaturated diene polymer elastomer, said elastomer being a polymer of (a) a conjugated aliphatic diolefin, or (b) a conjugated aliphatic diolefin and one or more other unsaturated monomers containing copolymerized therein at least 25% by weight of said aliphatic conjugated diolefin, cured with a compound having the general formula

Y[SO₂NX₂]ₙ where X is chlorine, bromine or iodine, Y is unsubstituted, alkyl-substituted or aryl-substituted phenyl, naphthyl, biphenyl or

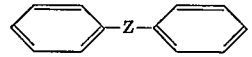

where Z is oxygen, sulfur, or alkylene or alkylidene having from 1 to 3 carbon atoms, and n has a value of 2 or 3 as the sole vulcanization agent.

17. The product of claim 16 wherein said compound is N,N,N',N'-tetrachloro-oxy-bis(benzenesulfonamide).

18. The product of claim 17 wherein said elastomer is a butadiene-acrylonitrile copolymer.

19. A rubbery terpolymer of ethylene, propylene and a non-conjugated diene monomer cured with a compound having the general formula $$Y[SO_2NX_2]_n$$

where X is chlorine, bromine or iodine, Y is unsubstituted, alkyl-substituted or aryl-substituted phenyl, naphthyl, biphenyl or

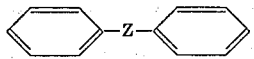

where Z is oxygen, sulfur, or alkylene or alkylidene having from 1 to 3 carbon atoms, and $n$ has a value of 2 or 3, and a quinone-oximino compound.

20. A rubbery terpolymer of ethylene, propylene and a non-conjugated diene monomer cured with N,N,N',N'-tetrachloro-oxy-bis(benzenesulfonamide) and p-quinone dioxime.

21. A rubber terpolymer of ethylene, propylene and a non-conjugated diene monomer cured with N,N,N',N'-tetrachloro-1,3-benzenedisulfonamide and p-quinone dioxime.

References Cited
UNITED STATES PATENTS

| | | | |
|---|---|---|---|
| 2,548,505 | 4/1951 | Turner | 260—23.7 |
| 3,507,917 | 4/1970 | Peterson | 260—543 A |

JAMES A. SEIDLECK, Primary Examiner

U.S. Cl. X.R.

260—80.78, 83.3, 83.5; 85.1, 85.3 C, 94.7 HA, 769